United States Patent
Zhou et al.

(10) Patent No.: US 12,056,953 B2
(45) Date of Patent: Aug. 6, 2024

(54) METHOD AND APPARATUS FOR FINGERPRINT IDENTIFICATION AND ELECTRONIC DEVICE

(71) Applicant: SHENZHEN GOODIX TECHNOLOGY CO., LTD., Guangdong (CN)

(72) Inventors: Luming Zhou, Guangdong (CN); Siqiu Cheng, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/867,824

(22) Filed: Jul. 19, 2022

(65) Prior Publication Data

US 2022/0351541 A1  Nov. 3, 2022

Related U.S. Application Data

(63) Continuation of application No. PCT/CN2021/086254, filed on Apr. 9, 2021.

(51) Int. Cl.
*G06V 40/12* (2022.01)
*G06V 10/60* (2022.01)

(52) U.S. Cl.
CPC .......... *G06V 40/1365* (2022.01); *G06V 10/60* (2022.01)

(58) Field of Classification Search
CPC ................................................ G06V 40/1365
See application file for complete search history.

(56) References Cited

U.S. PATENT DOCUMENTS 9,152,839 B2   10/2015  Yi et al.
2014/0286544 A1  9/2014  Yi et al.
(Continued)

FOREIGN PATENT DOCUMENTS

CN   106599875 A   4/2017
CN   107690653 A   2/2018
(Continued)

OTHER PUBLICATIONS

Translation of WO2018/018988A1 (Year: 2018).*
(Continued)

*Primary Examiner* — Lixi C Simpson
(74) *Attorney, Agent, or Firm* — Scully, Scott, Murphy & Presser, P.C.

(57) ABSTRACT

A fingerprint identification method, includes: collecting a first fingerprint image according to a sampling parameter; determining a collection environment of the first fingerprint image according to the first fingerprint image and a pre-stored reference image, wherein the reference image is a fingerprint image obtained under a reference light environment; processing the first fingerprint image according to a processing parameter corresponding to the collection environment; and performing fingerprint identification according to the processed first fingerprint image. By pre-storing the reference image, the present application can quickly judge the collection environment of the fingerprint by collecting only one fingerprint image, which saves time for collecting the fingerprint image and judging the collection environment, and improves the identification efficiency of the fingerprint effectively.

14 Claims, 4 Drawing Sheets

(56) References Cited

U.S. PATENT DOCUMENTS

| | | | | |
|---|---|---|---|---|
| 2019/0012507 A1* | 1/2019 | Dattalo | | G06V 40/1318 |
| 2019/0057237 A1 | 2/2019 | Zuo et al. | | |
| 2020/0394378 A1* | 12/2020 | Riehl | | G06F 21/32 |
| 2021/0064839 A1* | 3/2021 | Lee | | G06T 3/4038 |
| 2021/0224574 A1* | 7/2021 | Yang | | G06V 40/45 |
| 2021/0326561 A1 | 10/2021 | Qiu | | |

FOREIGN PATENT DOCUMENTS

| | | | | | |
|---|---|---|---|---|---|
| CN | 108040240 | A | | 5/2018 | |
| CN | 109241859 | A | | 1/2019 | |
| CN | 109685032 | A | * | 4/2019 | G06F 1/1684 |
| CN | 109711255 | A | | 5/2019 | |
| CN | 109901754 | A | | 6/2019 | |
| CN | 110992561 | A | | 4/2020 | |
| CN | 111259708 | A | | 6/2020 | |
| CN | 111414810 | A | | 7/2020 | |
| CN | 111801683 | A | | 10/2020 | |
| CN | 112241652 | A | | 1/2021 | |
| CN | 112262392 | A | | 1/2021 | |
| CN | 112507917 | A | | 3/2021 | |
| CN | 112528888 | A | | 3/2021 | |
| EP | 3462374 | A1 | | 4/2019 | |
| EP | 3576015 | A1 | | 12/2019 | |
| WO | WO-2018018988 | A1 | * | 2/2018 | G06F 21/32 |
| WO | 2020168858 | A1 | | 8/2020 | |
| WO | 2021037157 | A1 | | 3/2021 | |

OTHER PUBLICATIONS

English translation of CN109685032A (Year: 2019).*
Liu, Z. et al., "Research on Fingerprint Image Dryness Humidity Evaluation and Brightness Automatic Adjustment", Journal of Changchun University of Science and Technology (Natural Science Edition), Oct. 2018, pp. 83-87, vol. 41, No. 5, with English language abstract.
Zhang, A. et al., "Fingerprint Database Optimization Method for Indoor Localization Based on Neighbor Mean Filter", 2018 7th International Conference on Agro-geoinformatics, Hangzhou, China, 2018, pp. 1-6.

* cited by examiner

| Area 1 | Area 2 | ... | |
| --- | --- | --- | --- |
| | | | |
| | | | |
| | | | |
| | | | |

First fingerprint image 300

METHOD AND APPARATUS FOR FINGERPRINT IDENTIFICATION AND ELECTRONIC DEVICE

CROSS REFERENCE

This application is a continuation of International Application No. PCT/CN2021/086254, filed on Apr. 9, 2021, the disclosure of which is hereby incorporated by reference in its entirety.

TECHNICAL FIELD

The present application relates to the field of optical fingerprint technologies, and more particularly, to a method and apparatus for fingerprint identification and an electronic device.

BACKGROUND

With the continuous development of smart devices, the under-screen fingerprint identification technology has been widely used. In the under-screen fingerprint identification technology, imaging is performed according to the difference of reflection abilities of a ridge and a valley of a fingerprint to light, so as to perform fingerprint identification. Usually, the result of fingerprint identification will be affected by the external environment. For example, when the terminal device is in an environment with strong illumination, the signal may exceed a range of a fingerprint device, and valid fingerprint image data cannot be obtained. Therefore, how to improve the accuracy of fingerprint identification under the change of the external environment is an urgent problem to be solved.

SUMMARY

The embodiment of the present application provides a method and device for fingerprint identification and an electronic device, which can realize dynamic adjustment of fingerprint identification and improve fingerprint imaging qualities without adding additional hardware.

In a first aspect, provided is a fingerprint identification method, including: collecting a first fingerprint image according to a sampling parameter; determining a collection environment of the first fingerprint image according to the first fingerprint image and a pre-stored reference image, wherein the reference image is a fingerprint image obtained under a reference light environment; processing the first fingerprint image according to a processing parameter corresponding to the collection environment; and performing fingerprint identification according to the processed first fingerprint image.

It should be understood that the reference image may be the fingerprint image, or may be a simulated image simulating finger pressing under the reference light environment.

In the technical solution of the embodiment of the present application, by pre-storing the reference image under the reference light environment, without adding an additional strong light sensing unit, a light feature of the collection environment and a light feature of the pre-stored reference image are extracted from the collected fingerprint image to compare and process, to judge the collection environment of the fingerprint image; and the fingerprint image is processed according to the processing parameter corresponding to the collection environment. Since the reference image is pre-stored, the fingerprint identification apparatus can quickly judge the collection environment of the fingerprint by collecting only one image, which saves time for collecting the fingerprint image and judging the collection environment of the fingerprint, and improves the work efficiency of the fingerprint collection apparatus.

In a possible implementation manner, the collection environment includes: the reference light environment or a non-reference light environment.

In the technical solution of the embodiment of the present application, the reference light environment includes a normal light environment with an illumination intensity of 0-1000 Lux, and the non-reference light environment includes a strong light environment with an illumination intensity greater than or equal to 1000 Lux.

In a possible implementation manner, the determining a collection environment of the first fingerprint image according to the first fingerprint image and a pre-stored reference image includes: determining the collection environment of the first fingerprint image according to a pixel value difference of the first fingerprint image and the pre-stored reference image.

In a possible implementation manner, the determining the collection environment of the first fingerprint image according to the first fingerprint image and the pre-stored reference image includes: determining the collection environment of the first fingerprint image according to change trends of the first fingerprint image and a boundary pixel value of the pre-stored reference image.

In the technical solution of the embodiment of the present application, the fingerprint identification apparatus does not need to collect a picture with or without a backlight respectively to compare and determine the environment light so as to judge the collection environment of the fingerprint according to the environmental light, but directly compare features of the collected fingerprint image and the reference image to judge the collection environment, which simplifies steps of collecting the fingerprint image and judging the collection environment, and improves the working efficiency of the fingerprint identification apparatus.

In a possible implementation manner, the determining the collection environment of the first fingerprint image according to a pixel value difference of the first fingerprint image and the pre-stored reference image includes: when the number of areas, which an average of the pixel value difference in a plurality of areas of the first fingerprint image is greater than a first preset average, is greater than the number of preset areas, determining that an environment of fingerprint identification where the fingerprint image is located is the non-reference light environment.

In a possible implementation manner, the determining the collection environment of the first fingerprint image according to a pixel value difference of the first fingerprint image and the pre-stored reference image includes: when the number of areas, which the average of the pixel value difference in a plurality of areas of the first fingerprint image is greater than the first preset average, is less than or equal to the number of preset areas, determining that an environment of fingerprint identification where the fingerprint image is located is the reference light environment.

It should be understood that the average of the pixel value difference in the area is an average of a difference between a pixel value of the first fingerprint image in one area of the first fingerprint image and a pixel value of the corresponding area of the reference image, that is, an average of the pixel value difference in one area of the first fingerprint image.

In the technical solution of the embodiment of the present application, the collected fingerprint image is divided into several areas for processing, and accordingly, the reference image is also divided into several areas to compare with the several areas of the fingerprint image, the fingerprint image is refined into different areas, the average of the pixel value difference of each pixel point of each area and the pixel point of the corresponding reference image is counted, and then whether the number of areas, which the area average is greater than the first preset average, is greater than the number of preset areas is judged, so as to more comprehensive and reasonably judge the overall situation of the fingerprint image.

It should be understood that the first preset average is a threshold for judging the average of pixel value difference in each of the areas, and is positively correlated with the number of the areas.

In a possible implementation manner, the determining a collection environment of the first fingerprint image according to the first fingerprint image and a pre-stored reference image includes: determining the collection environment of the first fingerprint image according to a pixel value difference of the first fingerprint image and the pre-stored reference image and the pixel value of the first fingerprint image.

In the technical solution of the embodiment of the present application, by combining two parameters of the pixel data of the collected fingerprint image per se and comparison data of the fingerprint image and the reference image, the collection environment can be more accurately judged, and the judgment ability of the fingerprint identification apparatus on the collection environment can be further improved.

In a possible implementation manner, the determining the collection environment of the first fingerprint image according to a pixel value difference of the first fingerprint image and the pre-stored reference image includes: when a ratio of the number of saturated pixels of the pixel value in the first fingerprint image to the number of pixels in the first fingerprint image is greater than a preset ratio, and the number of areas, which the average of the pixel value difference in the first fingerprint image is greater than the first preset average, is greater than the number of preset areas, determining that the collection environment where the first fingerprint image is located is the non-reference light environment.

In a possible implementation manner, the determining the collection environment of the first fingerprint image according to a pixel value difference of the first fingerprint image and the pre-stored reference image and the pixel value of the first fingerprint image includes: when a ratio of the number of saturated pixels of the pixel value in the first fingerprint image to the number of pixels in the first fingerprint image is less than or equal to a preset ratio, and/or the number of areas, which the average of the pixel value difference in the first fingerprint image is greater than the first preset average, is less than or equal to the number of preset areas, determining that the collection environment where the first fingerprint image is located is the reference light environment.

In a possible implementation manner, the determining the collection environment of the first fingerprint image according to a pixel value difference of the first fingerprint image and the pre-stored reference image includes: when a ratio of the number of saturated pixels of the pixel value in the first fingerprint image to the number of pixels in the first fingerprint image is greater than a preset ratio, and the average of the pixel value difference is greater than a second preset average, determining that the collection environment of the first fingerprint image is the non-reference light environment.

In a possible implementation manner, the determining the collection environment of the first fingerprint image according to a pixel value difference of the first fingerprint image and the pre-stored reference image includes: when a ratio of the number of saturated pixels of the pixel value in the first fingerprint image to the number of pixels in the first fingerprint image is less than or equal to a preset ratio, and/or the average of the pixel value difference is less than or equal to a second preset average, determining that the collection environment of the first fingerprint image is the reference light environment.

It should be understood that the second preset average is a threshold for judging an average of the pixel value difference of the fingerprint image and full-image of the reference image, and can be configured according to the number of pixels.

In the technical solution of the embodiment of the present application, in the case of introducing the pixel data of the fingerprint image per se, the fingerprint image and the reference image may not be divided into areas. By counting a ratio of the number of saturated pixel points of the pixel value in the collected fingerprint image to the pixel point in the full image, and the average of pixel value difference of each pixel point of the full image of the fingerprint image and reference image, the preset ratio and the second preset average are compared, which not only avoids an error that may be resulted from using only a single judgment condition for judging, but also simplifies the judgment process, and further optimizes a judgment ability of the fingerprint preparation apparatus for the collection environment.

In a possible implementation manner, the method further includes: adjusting the sampling parameter according to the non-reference light environment.

In the technical solution of the embodiment of the present application, under the non-reference light environment, the sampling parameter is adjusted and optimized after the fingerprint identification is completed, so that subsequent sampling uses the adjusted sampling parameter, thereby further avoiding problems such as an unclear fingerprint pattern caused by an improper sampling parameter under the non-reference light environment. By judging the collection environment, the collection parameter of the fingerprint image can be dynamically adjusted, more effective fingerprint information can be obtained from the fingerprint image collected subsequently, and the identification performance of the fingerprint identification apparatus can be improved.

In a possible implementation manner, the method further includes: according to an identification result corresponding to the processed first fingerprint image, adjusting the first preset average and the number of the preset areas.

In a possible implementation manner, the method further includes: according to an identification result corresponding to the processed first fingerprint image, adjusting the second preset average and the preset ratio.

In a possible implementation manner, the method further includes: according to an identification result corresponding to the processed first fingerprint image, adjusting the first preset average, the number of the preset areas and the preset ratio.

In the technical solution of the embodiment of the present application, under the reference light environment, a corresponding fingerprint identification result is obtained after fingerprint identification is performed. When a fingerprint image texture is unclear and the identification is unsuccessful, a feedback mechanism is provided, which can dynamically adjust the judgment parameter of the collection environment according to the identification result, that is, the first preset average, the second preset average, the number of the preset areas and the preset ratio. By feeding back the identification result and adaptively adjusting the judgment parameter of the collection environment, the accuracy of the fingerprint identification apparatus in judging the collection environment can be improved, so that the fingerprint identification apparatus can use the corresponding processing parameter to process the fingerprint image to obtain more effective fingerprint information.

In a possible implementation manner, the sampling parameter comprises an exposure time, a gain parameter and an exposure area.

In a possible implementation manner, the adjusting the sampling parameter according to the non-reference light environment includes: according to the non-reference light environment, reducing an exposure time, and/or reducing a gain parameter.

In a possible implementation manner, the according to an identification result corresponding to the processed first fingerprint image, adjusting the first preset average and the number of the preset areas includes: when the identification of the first fingerprint image is unsuccessful, reducing the first preset average number and/or the number of preset area.

In a possible implementation manner, the according to an identification result corresponding to the processed first fingerprint image, adjusting the second preset average and the preset ratio includes: when the identification of the first fingerprint image is unsuccessful, reducing the second preset average and/or the preset ratio.

In a second aspect, provided is a fingerprint identification apparatus, including:
  an optical fingerprint sensor, configured to collect a fingerprint image according to a sampling parameter;
  a processing unit, configured to determine a collection environment of the first fingerprint image according to the first fingerprint image and a pre-stored reference image, wherein the reference image is a fingerprint image obtained under a reference light environment; process the first fingerprint image according to a processing parameter corresponding to the collection environment; and perform fingerprint identification according to the processed first fingerprint image.

In a possible implementation manner, the collection environment includes: the reference light environment or a non-reference light environment.

In a possible implementation manner, the processing unit is configured to: determine the collection environment of the first fingerprint image according to a pixel value difference of the first fingerprint image and the pre-stored reference image.

In a possible implementation manner, the processing unit is configured to: determine the collection environment of the first fingerprint image according to change trends of the first fingerprint image and a boundary pixel value of the pre-stored reference image.

In a possible implementation manner, the processing unit is configured to: when the number of areas, which an average of the pixel value difference in a plurality of areas of the first fingerprint image is greater than a first preset average, is greater than the number of preset areas, determine that an environment of fingerprint identification where the fingerprint image is located is the non-reference light environment.

In a possible implementation manner, the processing unit is configured to: when the number of areas, which the average of the pixel value difference in a plurality of areas of the first fingerprint image is greater than the first preset average, is less than or equal to the number of preset areas, determine that an environment of fingerprint identification where the fingerprint image is located is the reference light environment.

In a possible implementation manner, the processing unit is configured to: determine the collection environment of the first fingerprint image according to a pixel value difference of the first fingerprint image and the pre-stored reference image and the pixel value of the first fingerprint image.

In a possible implementation manner, the processing unit is configured to: when a ratio of the number of saturated pixels of the pixel value in the first fingerprint image to the number of pixels in the first fingerprint image is greater than a preset ratio, and the average of the pixel value difference is greater than a second preset average, determine that the collection environment of the first fingerprint image is the non-reference light environment.

In a possible implementation manner, the processing unit is configured to: when a ratio of the number of saturated pixels of the pixel value in the first fingerprint image to the number of pixels in the first fingerprint image is less than or equal to a preset ratio, and/or the average of the pixel value difference is less than or equal to a second preset average, determine that the collection environment of the first fingerprint image is the reference light environment.

In a possible implementation manner, the processing unit is further configured to: adjust the sampling parameter according to the non-reference light environment.

In a possible implementation manner, the processing unit is further configured to: according to an identification result corresponding to the processed first fingerprint image, adjust the first preset average and the number of the preset areas.

In a possible implementation manner, the processing unit is further configured to: according to an identification result corresponding to the processed first fingerprint image, adjust the second preset average and the preset ratio.

In a possible implementation manner, the sampling parameter comprises an exposure time, a gain parameter and an exposure area.

In a possible implementation manner, the processing unit is further configured to: according to the non-reference light environment, reduce an exposure time, and/or reduce a gain parameter.

In a possible implementation manner, when the identification of the first fingerprint image is unsuccessful, the first preset average number and/or the number of preset area is reduced.

In a possible implementation manner, the processing unit is further configured to: when the identification of the first fingerprint image is unsuccessful, reduce the second preset average and/or the preset ratio.

In a third aspect, an electronic device is provided, including: a display screen, and the fingerprint identification apparatus according to the second aspect and any one of possible implementation manners of the second aspect.

DESCRIPTION OF EMBODIMENTS

The Technical solutions in embodiments of the present application will be described hereinafter with reference to the accompanying drawings.

It should be understood that embodiments of the present application may be applied to an optical fingerprint system, including but not limited to an optical fingerprint identification system and a product based on optical fingerprint imaging. The embodiments of the present application are described only by an example of an optical fingerprint system, which should not constitute any limitation to the embodiments of the present application, and the embodiments of the present application are also applicable to other systems using an optical imaging technology or the like.

As a common application scenario, the optical fingerprint system provided in an embodiment of the present application may be applied to a smart phone, a tablet computer, and other mobile terminals having a display screen or other electronic devices. More specifically, in the foregoing electronic device, an optical fingerprint module may be disposed in a partial region or an entire region under a display screen, thereby forming an under-display (under-screen) optical fingerprint system. Alternatively, the optical fingerprint module may be partially or entirely integrated into the interior of the display screen of the electronic device to form an in-display optical fingerprint system.

The optical under-screen fingerprint detection technology uses light returned from a top surface of a display component of a device for fingerprint sensing and other sensing operations. The returned light carries information of an object such as a finger in contact with the top surface, and optical fingerprint detection of a particular optical sensor module located under a display screen is implemented by capturing and detecting the returned light by the finger. An optical sensor module may be designed to achieve desired optical imaging by properly configuring an optical element for capturing and detecting the returned light.

Figure 1A:
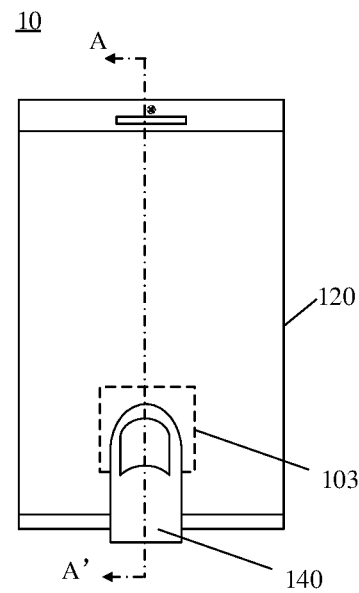
FIGS. 1A and 1B are schematic diagrams of an electronic device to which an embodiment of the present application is applicable.

FIG. 1A is a schematic plan view of an electronic device according to an embodiment of the present application. The electronic device may include, but is not limited to, a mobile terminal, a mobile telephone, a user equipment (UE), a handset, portable equipment, and the like. As shown in FIG. 1A, the electronic device 10 includes a display screen 120 and a fingerprint identification apparatus 130. The fingerprint identification apparatus 130 is disposed in a partial region under the display screen 120. The fingerprint identification apparatus 130 includes an optical fingerprint sensor that includes a sensing array 133 having a plurality of optical sensing units 131 (which may also be referred to as pixels, photosensitive pixels, pixel units, etc.). A region where the sensing array 133 is located or a sensing region of the sensing array 133 is a fingerprint identification region 103 of the fingerprint identification apparatus 130. As shown in FIG. 1A, the fingerprint identification region 103 is located in a display region of the display screen 120. In an alternative implementation manner, the fingerprint identification apparatus 130 is disposed at other positions, such as a side of the display screen 120 or an edge non-light transmitting region of the electronic device 10, and a light signal from at least part of the display region of the display screen 120 is directed to the fingerprint identification apparatus 130 through a light path design, such that the fingerprint identification region 103 is actually located in the display region of the display screen 120.

It should be understood that an area of the fingerprint identification region 103 may be different from an area of the sensing array 133 of the fingerprint identification apparatus 130. For example, the area of the fingerprint identification region 103 of the fingerprint identification apparatus 130 is larger than the area of the sensing array 133 of the fingerprint identification apparatus 130 through a light path design such as lens imaging, reflective folding, or light convergence or reflection, etc. In other alternative implementation manners, if a light path is directed in a manner of light collimation for example, the area of the fingerprint identification region 103 of the fingerprint identification apparatus 130 may also be designed to be substantially identical with the area of the sensing array 133 of the fingerprint identification apparatus 130.

Therefore, when a user needs to unlock the electronic device 10 or perform other fingerprint verification, a fingerprint input can be implemented merely by pressing a finger on the fingerprint identification region 103 in the display screen 120. Since fingerprint detection may be implemented in the screen, there is no need to exclusively reserve space for a front surface of the electronic device 10 adopting the foregoing structure to set a fingerprint button (such as a Home button), so that a full screen solution may be adopted; that is, the display region of the display screen 120 may be substantially extended to an entire front surface of the electronic device 10.

It should be understood that, in specific implementation, the electronic device 10 may further include a transparent protective cover; and the cover may be a glass cover or a sapphire cover, which is located above the display screen 120 and covers a front surface of the electronic device 10. Therefore, in an embodiment of the present application, the so-called finger being pressed against the display screen 120 actually refers to the finger being pressed against a cover above the display screen 120 or a surface of a protective layer covering the cover.

Figure 1B:
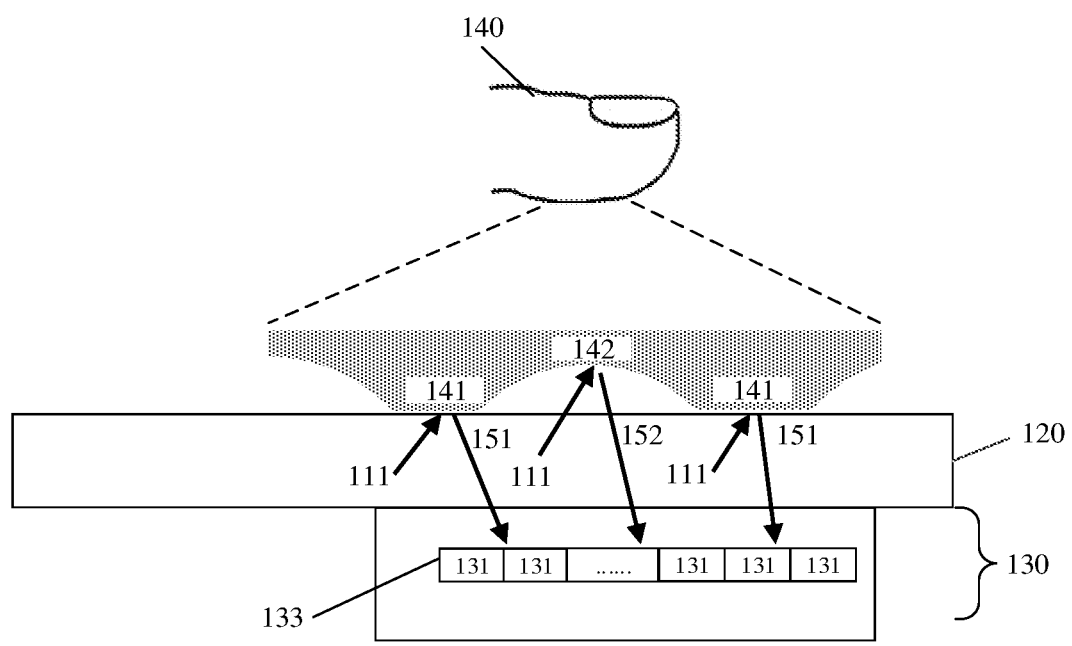

Optionally, as shown in FIG. 1B, the display screen 120 may adopt a display screen having a self-emitting display unit, for example, an organic light-emitting diode (OLED) display screen or a micro light-emitting diode (LED) display screen. Taking an OLED display screen as an example, the optical fingerprint identification apparatus 130 may use a display unit (that is, an OLED light source) of the OLED display screen 120 located in the fingerprint identification region 103 as an excitation light source for optical fingerprint detection. When a finger 140 is pressed against the fingerprint identification region 103, the display screen 120 emits a beam of light 111 to a finger 140 above the fingerprint identification region 103, and the light 111 is reflected by a surface of the finger 140 to form reflected light or form scattered light after scattering inside the finger 140. In related patent applications, the reflected light and scattered light are also collectively referred to as reflected light for convenience of description. Since a ridge 141 and a valley 142 of a fingerprint have different light reflecting abilities, reflected light 151 from the ridge of the fingerprint and reflected light 152 from the valley of the fingerprint have different light intensities. After passing through the optical component, the reflected light is received by the sensing array 133 in the fingerprint identification apparatus 130 and converted into a corresponding electrical signal, that is, a fingerprint detection signal. Fingerprint image data can be obtained based on the fingerprint detection signal, and fingerprint matching verification can be further performed, thereby implementing an optical fingerprint identification function in the electronic device 10.

Optionally, the fingerprint identification apparatus 130 may also use an internal light source or an external light source to provide a light signal for fingerprint detection. In this case, the fingerprint identification apparatus 130 may be applied to a non-self-emitting display screen, such as a liquid crystal display screen or other passive light-emitting display screens. As an example, in a case where a liquid crystal display screen having a backlight module and a liquid crystal panel is applied, in order to support under-screen fingerprint detection of the liquid crystal display screen, the optical fingerprint system of the electronic device 10 may further include an excitation light source for optical fingerprint detection. The excitation light source may specifically be an infrared light source or a light source of non-visible light with a specific wavelength, which may be disposed under the backlight module of the liquid crystal display screen or disposed in an edge region under a protective cover of the electronic device 10. The fingerprint identification apparatus 130 may be disposed under the liquid crystal panel or the edge region of the protective cover, and by being directed over a light path, light for fingerprint detection may reach the fingerprint identification apparatus 130. Alternatively, the fingerprint identification apparatus 130 may also be disposed under the backlight module, and the backlight module allows the light for fingerprint detection to pass through the liquid crystal panel and the backlight module and reach the fingerprint identification apparatus 130 by providing a hole on film layers such as a diffusion sheet, a brightening sheet, a reflection sheet or the like, or by performing other optical designs. When the fingerprint identification apparatus 130 uses an internal light source or an external light source to provide a light signal for fingerprint detection, a detection principle is consistent with the foregoing description.

The electronic device 10 may further include a circuit board that is disposed under the fingerprint identification apparatus 130. The fingerprint identification apparatus 130 may be bonded to the circuit board by a back adhesive, and achieve electrical connection with the circuit board by welding of a pad and a mental wire. The fingerprint identification apparatus 130 may achieve electrical interconnection and signal transmission with other peripheral circuits or other elements of the electronic device 10 through the circuit board. For example, the fingerprint identification apparatus 130 may receive a control signal of a processing unit of the electronic device 10 through the circuit board, and may also output a fingerprint detection signal from the fingerprint identification apparatus 130 to the processing unit, a control unit and the like of the electronic device 10 through the circuit board.

In the actual optical fingerprint detection process, because the light environment where the fingerprint to be identified is located has an environmental light with an uncontrollable intensity, it will affect a reflected light reflected by the fingerprint. When the environmental light is strong, it is easy to exceed a pixel unit range in the optical fingerprint sensor, thereby losing fingerprint texture information, and affecting the identification performance of the fingerprint identification apparatus. For the above strong light scene, a strong light sensing unit can be additionally set in the fingerprint sensor. According to the light signal received by the strong light sensing unit, it is judged whether it is currently in the strong light scene, so as to adjust a working condition of the fingerprint identification apparatus when collecting fingerprint information or an image condition after the fingerprint information is collected, etc. However, the additionally set strong light sensing unit will increase the cost of the fingerprint identification apparatus. In addition, the fingerprint identification apparatus can collect a fingerprint picture when the display screen emits light and does not emit light respectively, and judge whether it is in the strong light scene according to fingerprint clarity degrees of the two pictures, but this solution needs to collect two pictures to judge the intensity of the environmental light, causing a slow response speed of the fingerprint identification apparatus.

In view of this, the embodiment of the present application proposes a fingerprint identification method. By pre-storing a reference image in a normal environmental light scene, only one picture needs to be collected to compare with the pre-stored reference image to judge the strong light scene. The fingerprint identification result feedback mechanism can continuously and dynamically adjust a judgment parameter of the strong light scene, and a sampling parameter when collecting the fingerprint image of the fingerprint to be identified, thereby reducing the influence of the environmental light on the fingerprint collection during the fingerprint detection process.

Figures 2, 3:
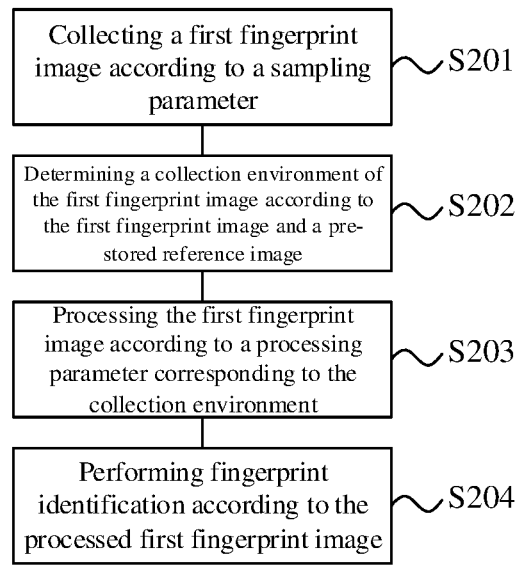
FIG. 2 is a schematic flowchart of a fingerprint identification method according to an embodiment of the present application.
FIG. 3 is a schematic diagram of several areas of a fingerprint image according to an embodiment of the present application.

FIG. 2 is a schematic flowchart of a fingerprint identification method according to an embodiment of the present application.

In S201, a first fingerprint image is collected according to a sampling parameter.

Specifically, the fingerprint identification apparatus uses a default sampling parameter to perform sampling according to an initial sampling parameter to obtain the fingerprint image, and the sampling parameter includes an exposure time, an exposure area, a gain parameter, and the like.

In S202, a collection environment of the first fingerprint image is determined according to the first fingerprint image and a pre-stored reference image, wherein the reference image is a fingerprint image obtained under a reference light environment.

Specifically, a reference image is pre-stored when the fingerprint identification apparatus is delivered, and is compared and processed according to the collected first fingerprint image and the pre-stored reference image, to judge the collection environment of the first fingerprint image. It should be understood that the reference image may be the fingerprint image, or may be a simulated image simulating finger pressing under the reference light environment, for example, a flesh-colored pressing simulated image under the reference light environment, that is, a flesh-colored simulated finger that is close to a real finger is used to obtain the reference image.

Optionally, the collection environment includes the reference light environment and the non-reference light environment.

Exemplarily, the reference light environment includes a normal light environment with an illumination intensity of 0-1000 Lux, and the non-reference light environment includes a strong light environment with an illumination intensity greater than or equal to 1000 Lux.

In S203, the first fingerprint image is processed according to a processing parameter corresponding to the collection environment.

Specifically, under the reference light environment and the non-reference light environment, the fingerprint identification apparatus uses different fingerprint identification processing parameters, and the fingerprint identification apparatus processes the fingerprint image according to the processing parameter corresponding to the collection environment after judging the collection environment. The processing parameter may be preset in the fingerprint identification apparatus, or may be dynamically adjusted according to the collection environment, which is not limited in the embodiment of the present application.

Illustratively, the processing parameter includes a pixel value quantization scale, a noise floor of the optical fingerprint sensor, and the like. For example, under the non-reference light environment, the pixel value quantization scale under the non-reference light is used to extract the fingerprint texture to obtain a clearer fingerprint image.

The pixel value quantization scale refers to the parameter used in the process of adjusting the data collected at different exposure times and with different gain parameters to the same exposure time and data corresponding to the same gain parameter. For example, the exposure time for default sampling is 100 μs, and the exposure time for non-reference light environment sampling is 50 μs. The sampling data under the non-reference light environment needs to be multiplied by the pixel value quantization scale, that is, multiplied by 2, and then is compared with data sampled under the default condition. When the optical fingerprint sensor uses different collection parameters to collect data, its noise floor (sensor base) is different, so it is necessary to subtract the corresponding noise floor when using different collection parameters to obtain an actual sensing value of the optical fingerprint sensor.

In S204, fingerprint identification is performed according to the processed first fingerprint image.

In the present embodiment, by pre-storing the reference image under the reference light environment, without adding an additional strong light sensing unit, a light feature of the collection environment and a light feature of the pre-stored reference image are extracted from the collected fingerprint image to compare and process, to judging the collection environment of the fingerprint image; and the fingerprint image is processed according to the processing parameter corresponding to the collection environment. Since the reference image is pre-stored, the fingerprint identification apparatus can quickly judge the collection environment of the fingerprint by collecting only one image, which saves time for collecting the fingerprint image and judging the collection environment of the fingerprint, and improves the work efficiency of the fingerprint collection apparatus. By judging the collection environment, the processing parameter of the fingerprint image can be dynamically adjusted, and the identification performance of the fingerprint identification apparatus can be improved.

Optionally, in S202, the collection environment of the first fingerprint image is determined according to a pixel value difference of the first fingerprint image and the pre-stored reference image.

Specifically, after the fingerprint identification apparatus collects the first fingerprint image, the pixel value of each pixel point of the first fingerprint image is counted. Since the reference image has been pre-stored, the fingerprint identification apparatus only needs to extract the pixel value information of the reference image to calculate the pixel value difference of the first fingerprint image, that is, the collection environment of the first fingerprint image can be judged by the condition of the difference of the pixel value. For example, when the average of pixel value difference is greater than the preset value, it is judged that the collection environment is the non-reference environment.

Optionally, in S202, the collection environment of the first fingerprint image is determined according to change trends of the first fingerprint image and a boundary pixel value of the pre-stored reference image.

Specifically, after the fingerprint identification apparatus collects the first fingerprint image, a change trend of the pixel value of the boundary pixel point of the first fingerprint image is counted, the change trend of the pixel value of the corresponding boundary pixel point of the reference image is extracted, and the collection environment of the first fingerprint image is judged by the change trend of the boundary pixel value. For example, if the change trend of the boundary pixel value of the first fingerprint image is greater than the change trend of the boundary pixel value of the reference image, it is judged that the collection environment is the non-reference environment.

In the present embodiment, the fingerprint identification apparatus does not need to collect a picture with or without a backlight respectively to compare and determine the environment light so as to judge the collection environment of the fingerprint according to the environmental light, but directly compare features of the collected fingerprint image and the reference image to judge the collection environment, which simplifies steps of collecting the fingerprint image and judging the collection environment, and improves the working efficiency of the fingerprint identification apparatus.

Optionally, in S202, when the number of areas, which an average of the pixel value difference in the first fingerprint image is greater than a first preset average, is greater than the number of preset areas, it is determined that an environment of fingerprint identification where the fingerprint image is located is the non-reference light environment.

Optionally, in S202, when the number of areas, which the average of the pixel value difference in a plurality of areas of the first fingerprint image is greater than the first preset average, is less than or equal to the number of preset areas, it is determined that an environment of fingerprint identification where the fingerprint image is located is the reference light environment.

Specifically, the first fingerprint image 300 is divided into several areas, as shown in FIG. 3. After differencing the pixel value of each pixel point of the first fingerprint image and the pixel value of each pixel point corresponding to the reference image, the average of the pixel value difference of each area is counted. After the average of the difference of each area is compared with the first preset average, the number of areas, which the average of difference is greater than the first preset average is counted. Only when the number of areas is greater than the preset number, it is judged that the collection environment is the non-reference light environment, and is the reference light environment in other cases.

It should be understood that the first preset average is a threshold for judging the average of pixel value difference in each of the areas, and is positively correlated with the number of the areas.

It should be understood that the preset number may be configured according to the number of areas and the first preset average.

In the present embodiment, the collected fingerprint image is refined into several areas for judging, so that the judgment result can more comprehensively and evenly reflect the overall environmental light condition of the full-image first fingerprint image.

Optionally, in S202, the collection environment of the first fingerprint image is determined according to a pixel value difference of the first fingerprint image and the pixel value of the pre-stored reference image.

Specifically, after the fingerprint identification apparatus collects the first fingerprint image, the number of saturated pixel point or the number of pixel point, which the pixel value in the entire first fingerprint image greater than a certain preset value, is counted. Combined with the pixel value difference of the first fingerprint image and the reference image, if the number of these pixel points is greater than the number of the present pixel points, and the pixel value difference is greater than the preset difference, it is judged that the collection environment is the non-reference environment.

Optionally, when a ratio of the number of saturated pixels of the pixel value in the first fingerprint image to the number of pixels in the first fingerprint image is greater than a preset ratio, and the number of areas, which the average of the pixel value difference in the first fingerprint image is greater than the first preset average, is greater than the number of preset areas, it is determined that the collection environment of the first fingerprint image is the non-reference light environment.

Optionally, when a ratio of the number of saturated pixels of the pixel value in the first fingerprint image to the number of pixels in the first fingerprint image is less than or equal to a preset ratio, and/or the number of areas, which the average of the pixel value difference in the first fingerprint image is greater than the first preset average, is less than or equal to the number of preset areas, it is determined that an environment of fingerprint identification where the fingerprint image is located is the reference light environment.

In the present embodiment, by combining two parameters of the pixel data of the collected fingerprint image per se and comparison data of the fingerprint image and the reference image, the collection environment can be more accurately judged, and the judgment ability of the fingerprint identification apparatus on the collection environment can be further improved.

Optionally, in S202, when a ratio of the number of saturated pixels of the pixel value in the first fingerprint image to the number of pixels in the first fingerprint image is greater than a preset ratio, and the average of the pixel value difference is greater than a second preset average, it is determined that the collection environment of the first fingerprint image is the non-reference light environment.

Optionally, in S202, when a ratio of the number of saturated pixels of the pixel value in the first fingerprint image to the number of pixels in the first fingerprint image is less than or equal to a preset ratio, and/or the average of the pixel value difference is less than or equal to a second preset average, it is determined that the collection environment of the first fingerprint image is the reference light environment.

Specifically, after the first fingerprint image collects the first fingerprint image, a ratio of the saturated pixel point of the pixel value in the first fingerprint image to the full-image pixel point is counted, and the average of the pixel value different of each pixel point of the first fingerprint image and the full image of the reference image is calculated. Only when the ratio is greater than the preset ratio and the average is greater than the second preset average, it is judged that the collection environment is the non-reference light environment, and is the reference light environment in other cases.

It should be understood that the second preset average is a threshold for judging an average of the pixel value difference of the fingerprint image and the full-image of the reference image.

It should be understood that in the case of introducing the pixel data of the fingerprint image per se, the method for dividing the fingerprint image can be combined. For example, using the comparison of the number of areas, which the number of the saturated pixel points of the pixel value in a plurality of areas of the fingerprint image greater than the preset quantity, is greater than the preset number, the collection environment is judged. Also, the fingerprint image and the reference image may not be divided into areas. By counting a ratio of the number of saturated pixel points of the pixel value in the collected fingerprint image to the pixel point in the full image, and the average of pixel value difference of each pixel point of the full image of the fingerprint image and reference image, the preset ratio and the second preset average are compared, to judge the collection environment.

In the present embodiment, the collection environment can be comprehensively judged through judgment parameters from two angles, which avoids a possible error when only a single judgment condition is used for judging, simplifies the judgment process, and further optimizes the ability of the fingerprint preparation apparatus to judge the collection environment.

Figure 4:
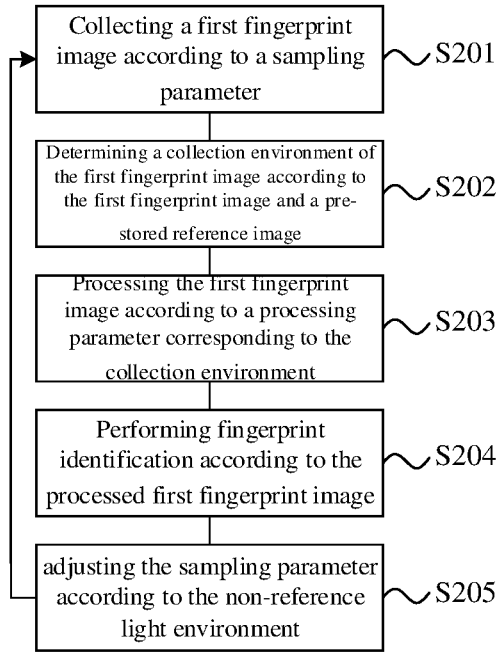
FIG. 4 is a schematic flowchart of another fingerprint identification method according to an embodiment of the present application.

Optionally, as shown in FIG. 4, it is a schematic flowchart of another fingerprint identification method according to an embodiment of the present application. The fingerprint identification method further includes:

S205, adjusting the sampling parameter according to the non-reference light environment.

Specifically, after the fingerprint identification apparatus processes the fingerprint image according to the processing parameter corresponding to the non-reference light environment and performs fingerprint identification, the sampling parameter is adjusted.

For example, after judging that it is the non-reference light environment and performing fingerprint identification, the exposure time of the optical fingerprint sensor in the fingerprint identification apparatus is reduced, so that the exposure time of subsequent sampling is reduced, and the non-reference light environment is reduced, such as the cases of sampling oversaturation and the resulted unclear fingerprint texture under the strong light environment. An effective area of the fingerprint image that is subsequently sampled by the fingerprint identification apparatus under the non-reference light environment increases.

For another example, after judging that it is the non-reference light environment and performing fingerprint identification, the sensitivity gain of the optical fingerprint sensor is reduced, the sensitivity is a luminous flux sensing amount under the unit illumination of the optical fingerprint sensor. The sensitivity gain is reduced under the non-reference light environment, the sensing amount of the optical fingerprint sensor is reduced, which can reduce the probability of oversaturation of the subsequent sampling image, so that the collected fingerprint image is clearer and has more effective fingerprint information.

For another example, after judging that it is the non-reference light environment and performing fingerprint identification, a non-reference light environment area is selected as an exposure area, and the exposure time and gain parameter of the exposure area are adjusted in a targeted manner, so that the collected fingerprint image is clearer and possess more details.

Figure 5:
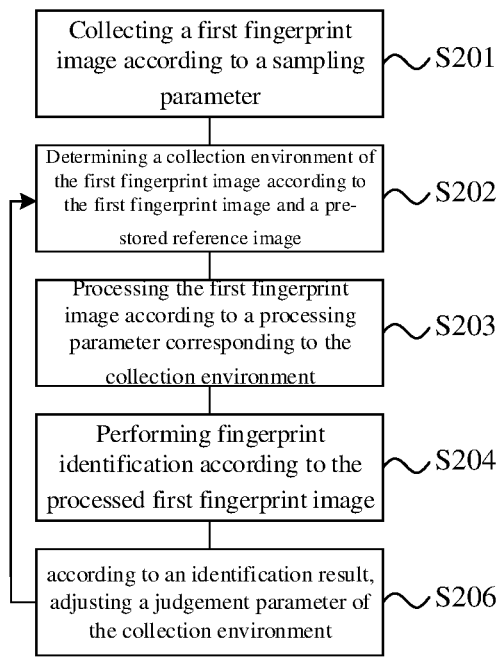
FIG. 5 is a schematic flowchart of another fingerprint identification method according to an embodiment of the present application.

Optionally, as shown in FIG. 5, it is a schematic flowchart of another fingerprint identification method according to an embodiment of the present application. The method further includes:

S206, according to an identification result corresponding to the processed first fingerprint image, adjusting a judgement basis of the collection environment.

Specifically, according to the identification result corresponding to the processed first fingerprint image, the first preset average and the number of the preset areas are adjusted.

For example, when the fingerprint identification apparatus processes the fingerprint image according to the processing parameter corresponding to the reference light environment and performs fingerprint identification, the fingerprint identification result is obtained. When the fingerprint identification is unsuccessful, it means that although the light environment is judged to be normal, the fingerprint texture is still unclear. It is necessary to adjust the judgment parameter of the collection environment, such as reducing the first preset average and/or the number of preset areas, so that the collection environment can be more easily judged as the non-reference light environment, and the processing parameter corresponding to the non-reference light environment is used to process the fingerprint image, to avoid the loss of fingerprint image details caused by an improper processing parameter. For another example, when the fingerprint identification is successful, the first preset average and/or the number of preset areas are increased, or the first preset average and/or the number of preset areas is maintained unchanged.

Specifically, according to an identification result corresponding to the processed first fingerprint image, the second preset average and the preset ratio are adjusted.

For example, when the fingerprint identification apparatus processes the fingerprint image according to the processing parameter corresponding to the reference light environment and performs fingerprint identification, the fingerprint identification result is obtained. When the fingerprint identification is unsuccessful, the second preset average and/or the preset ratio is reduced, so that the collection environment can be more easily judged as the non-reference light environment, and the processing parameter corresponding to the non-reference light environment is used to process the fingerprint image.

For another example, when the fingerprint identification is successful, the second preset average and/or the preset ratio is increased, or the second preset average and/or the preset ratio is maintained unchanged.

In the present embodiment, the fingerprint identification apparatus has a self-feedback mechanism inside, which can dynamically change the judgment parameter of the collection environment according to the fingerprint identification result, so that the fingerprint identification apparatus can continuously and adaptively adjust the judgment of the collection environment. When the accuracy of judging the collection environment is increased, by using a more flexible and accurate collection environment to judge, the fingerprint identification apparatus uses a more reasonable processing parameter to process the fingerprint identification image, thereby improving the working efficiency of the fingerprint identification apparatus.

Figure 6:
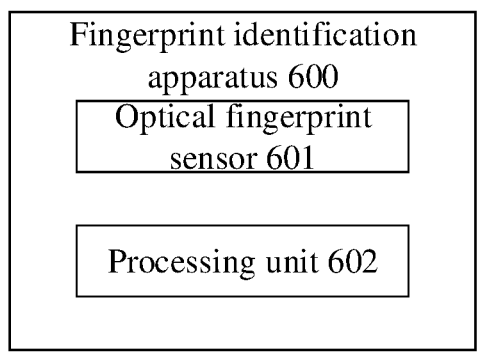
FIG. 6 is a schematic diagram of a fingerprint identification apparatus according to an embodiment of the present application.

As shown in FIG. 6, it is a schematic diagram of a fingerprint identification apparatus 600 according to an embodiment of the present application. The fingerprint identification apparatus includes:

An optical fingerprint sensor 601, configured to collect a fingerprint image according to a sampling parameter;

a processing unit 602, configured to determine a collection environment of the first fingerprint image according to the first fingerprint image and a pre-stored reference image, wherein the reference image is a fingerprint image obtained under a reference light environment; process the first fingerprint image according to a processing parameter corresponding to the collection environment; and perform fingerprint identification according to the processed first fingerprint image.

Optionally, the collection environment includes the reference light environment and the non-reference light environment.

Optionally, the processing parameter includes a pixel value quantization scale and a noise floor of the optical fingerprint sensor. For example, under the non-reference light environment, the processing unit 602 uses the pixel value quantization scale under the non-reference light to extract the fingerprint texture to obtain a clearer fingerprint image.

It should be understood that the function of the processing unit 602 may be performed by a processor or a processing module integrated in a fingerprint identification chip, or may be performed by a processor or a processing module in a terminal device including a fingerprint identification apparatus, which is not limited in the embodiment of the present application.

The processor may be a central processing unit (CPU), and the processor may also be another general-purpose processor, a digital signal processor (DSP), an application-specific integrated circuit (ASIC), a field-programmable gate array (FPGA) or another programmable logic device, a discrete gate or a transistor logic device, a discrete hardware component or the like. The general purpose processor may be a microprocessor or this processor may be any normal processor, or the like.

In the embodiment of the present application, the fingerprint identification apparatus only needs to collect one fingerprint image, and the processing unit 602 may judge the collection environment of the fingerprint by extracting pre-stored reference image and the collected fingerprint image for comparison, which saves time for collecting the fingerprint image and judging the collection environment, and improves the identification efficiency of the fingerprint effectively.

In a possible implementation manner, the processing unit 602 is configured to: determine the collection environment of the first fingerprint image according to a pixel value difference of the first fingerprint image and the pre-stored reference image.

Specifically, the processing unit 602 can extract the reference image pre-stored in the fingerprint identification apparatus, and extract a pixel value feature of the first fingerprint image after the optical fingerprint sensor 601 collects the first fingerprint image, difference the corresponding pixel value of the reference image to obtain the pixel value difference, and judge the collection environment according to the pixel value difference.

In a possible implementation manner, the processing unit 602 is configured to: determine the collection environment of the first fingerprint image according to change trends of the first fingerprint image and a boundary pixel value of the pre-stored reference image.

In a possible implementation manner, the processing unit 602 is configured to: when the number of areas, which an average of the pixel value difference in the first fingerprint image is greater than a first preset average, is greater than the number of preset areas, determine that an environment of fingerprint identification where the fingerprint image is located is the non-reference light environment.

In a possible implementation manner, the processing unit 602 is configured to: determine the collection environment of the first fingerprint image according to a pixel value difference of the first fingerprint image and the pre-stored reference image.

In a possible implementation manner, the processing unit 602 is configured to: when a ratio of the number of saturated pixels of the pixel value in the first fingerprint image to the number of pixels in the first fingerprint image is greater than a preset ratio, and the average of the pixel value difference is greater than a second preset average, determine that the collection environment of the first fingerprint image is the non-reference light environment.

In a possible implementation manner, the processing unit is 602 configured to: when a ratio of the number of saturated pixels of the pixel value in the first fingerprint image to the number of pixels in the first fingerprint image is less than or equal to a preset ratio, and/or the average of the pixel value difference is less than or equal to a second preset average, determine that the collection environment of the first fingerprint image is the reference light environment.

In a possible implementation manner, the processing unit 602 is further configured to configure to: adjust the sampling parameter according to the non-reference light environment.

The processing unit 602 adjusts the sampling parameter after identifying the fingerprint image under the non-reference light environment, controls the optical fingerprint sensor 601 to use the adjusted parameter to sample in subsequent sampling, optimizes the sampling process, and avoids problems such as the unclear fingerprint image texture due to the improper sampling parameter.

In a possible implementation manner, the processing unit 602 is further configured to: adjust the judgment parameter of the collection environment according to the identification result.

The processing unit 602 adjusts the judgment parameter of the collection environment after identifying the fingerprint image under the non-reference light environment, and obtains the identification result after judging the reference light environment and performing fingerprint identification. If the identification is unsuccessful, the judgment parameter is adjusted to make the collection environment more easily judged as the non-reference light environment, to avoid a judgment error caused by the improper judgment parameter, so that the fingerprint identification apparatus can continuously and adaptively adjust the judgment parameter through the identification result, and improve the accuracy of judging the collection environment, thereby ensuring that the fingerprint identification apparatus adopts a more reasonable and corresponding processing parameter to process the fingerprint identification image, and improves the work efficiency of the fingerprint identification apparatus.

For example, according to the identification result corresponding to the processed first fingerprint image, the first preset average and the number of the preset areas are adjusted.

Specifically, after the collection environment is judged to be the reference light environment for fingerprint identification, if the identification is unsuccessful, the first preset average and/or the number of preset areas is decreased; and if the identification is successful, the first preset average and/or the number of preset areas is increased, or the first preset average and/or the number of preset areas is maintained unchanged.

For another example, according to an identification result corresponding to the processed first fingerprint image, the second preset average and the preset ratio are adjusted.

Specifically, after the collection environment is judged to be the reference light environment for fingerprint identification, if the identification is unsuccessful, the second preset average and/or the preset ratio is reduced; and if the identification is successful, the second preset average and/or the preset ratio is increased, or the second preset average and/or the preset ratio is maintained unchanged.

Figure 7:
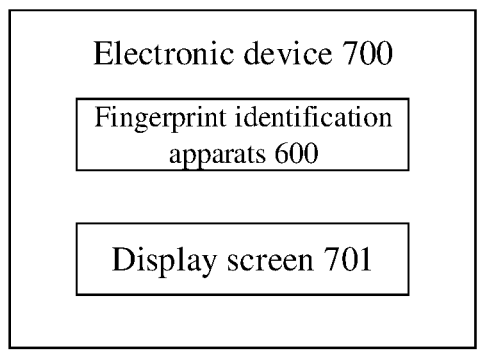
FIG. 7 is a schematic diagram of an electronic device according to an embodiment of the present application.

As shown in FIG. 7, an embodiment of the present application further provides an electronic device 700, including:

a display screen 701; and the fingerprint identification apparatus 600.

It should be understood that the display screen 701 may be an unfolded display screen or a foldable display screen, that is, a flexible display screen.

By way of example and not limitation, the electronic device in the embodiment of the present application may be portable or mobile computing devices such as a terminal device, a mobile phone, a tablet computer, a notebook computer, a desktop computer, a gaming device, an in-vehicle electronic device or a wearable smart device, and other electronic devices such as an electronic database, an automobile and an automated teller machine (ATM). The wearable smart device is full-featured and large-sized and can realize complete or partial functions without relying on a smart phone, such as a smart watch or smart glasses, and only focuses on a certain type of application function, and shall be used in cooperation with such other device as a smart phone, such as various types of smart bracelets, smart jewelry and other devices for physical sign monitoring.

It should be appreciated that, in a case of no conflict, the various embodiments and/or the technical features in the various embodiments described in the present application can be combined with each other arbitrarily, and the technical solutions obtained after the combination should also fall within the protection scope of the present application.

It should be understood that terms used in embodiments of the present application and the claims appended hereto are merely for the purpose of describing particular embodiments, and are not intended to limit the embodiments of the present application. For another example, "a", "the", and "the foregoing" in singular forms used in the embodiments of this application and the appended claims are intended to include a plural form, unless other meanings are clearly indicated in a context.

Those of ordinary skill in the art may be aware that, units of the examples described in the embodiments disclosed in this paper may be implemented by electronic hardware, computer software, or a combination of the two. To clearly illustrate interchangeability between the hardware and the software, the foregoing illustration has generally described composition and steps of the examples according to functions. Whether these functions are executed by hardware or software depends on the specific application and constraints of design of the technical solution. A person skilled in the art may use different methods to implement the described functions for each particular application, but it should not be considered that the implementation goes beyond the scope of this application.

In the several embodiments provided in the present application, it should be understood that, the disclosed system and apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual coupling or direct coupling or communication connection may be indirect coupling or communication connection through some interfaces, apparatuses or units, and may also be electrical, mechanical, or connection in other forms.

The units described as separate parts may or may not be physically separate, and parts displayed as units may or may not be physical units, may be located in one position, or may be distributed on multiple network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The foregoing integrated unit may be implemented in the form of hardware or in the form of a software functional unit.

If the integrated unit is implemented in the form of the software functional unit and is sold or used as an independent product, it may be stored in a computer readable storage medium. The computer software product is stored in a storage medium, and includes several instructions for instructing a computer device (which may be a personal computer, a server, a network device, or the like) to perform all or some of the steps of the methods described in the embodiments of this application. The storage medium includes: various media that may store program codes, such as a U-disk, a removable hard disk, a read-only memory (ROM), a random access memory (RAM), a magnetic disk, a compact disk, and so on.

The foregoing description is only a specific implementation manner of the present application. The protection scope of the present application, however, is not limited thereto. Various modifications or replacements may be readily conceivable to any person skilled in the art within the technical scope disclosed in the present application, and such modifications or replacements shall fall within the protection scope of the present application. Therefore, the protection scope of the present application shall be subject to the protection scope of the claims.

What is claimed is:

1. A fingerprint identification method, applied to a fingerprint identification apparatus, the method comprising:
    collecting a first fingerprint image according to a sampling parameter;
    determining a collection environment of the first fingerprint image according to the first fingerprint image and a pre-stored reference image, wherein the reference image is a fingerprint image obtained under a reference light environment;
    processing the first fingerprint image according to a processing parameter corresponding to the collection environment; and
    performing fingerprint identification according to the processed first fingerprint image;

wherein the determining a collection environment of the first fingerprint image according to the first fingerprint image and a pre-stored reference image comprises:
    determining the collection environment of the first fingerprint image according to a pixel value difference of the first fingerprint image and the pre-stored reference image.

2. The method according to claim 1, wherein the collection environment comprises:
    the reference light environment or a non-reference light environment.

3. The method according to claim 2, wherein the determining a collection environment of the first fingerprint image according to the first fingerprint image and a pre-stored reference image comprises:
    determining the collection environment of the first fingerprint image according to a pixel value difference of the first fingerprint image and the pre-stored reference image and the pixel value of the first fingerprint image.

4. The method according to claim 3, wherein the determining the collection environment of the first fingerprint image according to a pixel value difference of the first fingerprint image and the pre-stored reference image comprises:
    when a ratio of the number of saturated pixels of the pixel value in the first fingerprint image to the number of pixels in the first fingerprint image is greater than a preset ratio, and the average of the pixel value difference is greater than a second preset average, determining that the collection environment of the first fingerprint image is the non-reference light environment.

5. The method according to claim 4, wherein the method further comprises:
    adjusting the sampling parameter according to the non-reference light environment;
    wherein the adjusting the sampling parameter according to the non-reference light environment comprises:
    according to the non-reference light environment, reducing an exposure time, and/or reducing a gain parameter.

6. The method according to claim 3, wherein the determining the collection environment of the first fingerprint image according to a pixel value difference of the first fingerprint image and the pre-stored reference image comprises:
    when a ratio of the number of saturated pixels of the pixel value in the first fingerprint image to the number of pixels in the first fingerprint image is less than or equal to a preset ratio, and/or the average of the pixel value difference is less than or equal to a second preset average, determining that the collection environment of the first fingerprint image is the reference light environment.

7. The method according to claim 6, wherein the method further comprises:
    according to an identification result corresponding to the processed first fingerprint image, adjusting the second preset average and the preset ratio.

8. The method according to claim 7, wherein the according to an identification result corresponding to the processed first fingerprint image, adjusting the second preset average and the preset ratio comprises:
    when the identification of the first fingerprint image is unsuccessful, reducing the second preset average and/or the preset ratio.

9. The method according to claim 1, wherein the determining the collection environment of the first fingerprint image according to a pixel value difference of the first fingerprint image and the pre-stored reference image comprises:

when a number of areas, which an average of the pixel value difference in a plurality of areas of the first fingerprint image is greater than a first preset average, is greater than a number of preset areas, determining that an environment of fingerprint identification where the fingerprint image is located is the non-reference light environment.

10. The method according to claim 9, wherein the method further comprises:

adjusting the sampling parameter according to the non-reference light environment;

wherein the adjusting the sampling parameter according to the non-reference light environment comprises:

according to the non-reference light environment, reducing an exposure time, and/or reducing a gain parameter.

11. The method according to claim 1, wherein the determining the collection environment of the first fingerprint image according to a pixel value difference of the first fingerprint image and the pre-stored reference image comprises:

when the number of areas, which the average of the pixel value difference in a plurality of areas of the first fingerprint image is greater than the first preset average, is less than or equal to the number of preset areas, determining that an environment of fingerprint identification where the fingerprint image is located is the reference light environment.

12. The method according to claim 11, wherein the method further comprises:

according to an identification result corresponding to the processed first fingerprint image, adjusting the first preset average and the number of the preset areas.

13. The method according to claim 12, wherein the according to an identification result corresponding to the processed first fingerprint image, adjusting the first preset average and the number of the preset areas comprises:

when the identification of the first fingerprint image is unsuccessful, reducing the first preset average number and/or the number of preset area.

14. The method according to claim 1, wherein the sampling parameter comprises an exposure time, a gain parameter and an exposure area.

* * * * *